United States Patent [19]

Dudko et al.

[11] 3,976,481

[45] Aug. 24, 1976

[54] WEAR-RESISTANT COMPOSITE MATERIAL

[76] Inventors: Daniil Andreevich Dudko, ulitsa Anri Barbjusa, 22/27, kv. 143; Grigory Valentinovich Samsonov, ulitsa Vladimirskaya, 51-53, kv. 43; Boleslav Ivanovich Maximovich, ulitsa Anri Barbjusa, 22/26, kv. 99; Vitaly Ivanovich Zelenin, ulitsa Ezhena Potie, 9, kv. 7; Alexandr Sergeevich Klimanov, Bulvar Lesi Ukrainki, 9, kv. 50; Vladimir Nikolaevich Potseluiko, Darnitsky bulvar, 4a, kv. 144; Gennady Vasilievich Trunov, ulitsa Dobrokhotova, 24, kv. 63; Vasily Mikhailovich Sleptsov, ulitsa Vyborgskaya, 80/17, kv. 55, all of Kiev, U.S.S.R.

[22] Filed: Nov. 7, 1975

[21] Appl. No.: 630,014

Related U.S. Application Data

[60] Division of Ser. No. 535,155, Dec. 23, 1974, Pat. No. 3,933,482, which is a continuation of Ser. No. 424,075, Dec. 12, 1973, abandoned.

[30] Foreign Application Priority Data

Dec. 12, 1972 U.S.S.R............................. 1855761

[52] U.S. Cl................................. 75/171; 29/182.5; 29/191.2; 75/.5 BC; 75/202
[51] Int. Cl.$^2$...................... B23K 35/22; B23P 3/10
[58] Field of Search................. 75/171, 134 N, 202, 75/.5 BC; 29/182.5, 191.2

[56] References Cited

UNITED STATES PATENTS

| | | | |
|---|---|---|---|
| 2,936,229 | 5/1960 | Shepard | 75/171 X |
| 3,291,577 | 12/1966 | Davies | 29/191.2 |
| 3,320,056 | 5/1967 | Stoops | 75/201 |
| 3,725,015 | 4/1973 | Weaver | 29/182.1 |
| 3,802,850 | 4/1974 | Clougherty | 75/202 X |

*Primary Examiner*—Arthur J. Steiner
*Attorney, Agent, or Firm*—Holman & Stern

[57] ABSTRACT

A wear-resistant composite material incorporating a refractory chemical compound in particulate form and an alloy matrix. The particles contain between 7 and 30 wt.% of chromium, between 30 and 40 wt.% of boron, the balance being titanium, have a size between 0.3 and 2 mm and are present in an amount between 40 and 80 vol.%, the balance being the alloy matrix. The material has an improved resistance to wear and consists of comparatively cheap and widely abundant ingredients.

3 Claims, No Drawings

WEAR-RESISTANT COMPOSITE MATERIAL

This is a divisional of application Ser. No. 535,155 filed Dec. 23, 1974, now U.S. Pat. No. 3,933,482, which in turn is a Rule 60 Continuation of U.S. Ser. No. 424,075 filed Dec. 12, 1973, now abandoned.

BACKGROUND OF THE INVENTION

The present invention relates to a wear-resistant composite material finding application in hard facing a variety of components used in metallurgy and chemical industry, such as bells and valves of blast furnaces exposed to intensive abrasive wear in gases at normal and elevated temperatures or rolls of rolling mills, mixers, components of earth-moving equipment and heavy-duty vehicles which are subject to abrading, etc.

Used at present as materials which protect the surface of the components from wear are alloys, such as Sormite and Colmonoy. The alloys display a wear resistance which is higher than that of other known wear-resistant materials, yet they tend to develop numerous cracks and other flaws during the process of hard facing.

There is known, for example, a wear-resistant composite material made up of particulate refractory chemical compounds, namely cast tungsten carbides, and of a copper-based alloy matrix. This material has a wear resistance superior of that to other wear-resistant materials used in hard facing including those such as Sormite and Colmonoy. But this material includes tungsten which is expensive and in short supply.

Since the demand for wear-resistant composite materials for hard-facing applications is high, it can be met by providing a new material made up of ingredients which are both abundant and comparatively cheap. A lack of such material creates difficulties resulting from which are failures to assure the requisite service life of parts and protracted down periods due to the necessity of replacing or reclaiming the worn components.

SUMMARY OF THE INVENTION

It is the primary object of the present invention to provide a wear-resistant composite material displaying a resistance to wear and mechanical properties superior to the wear resistance and mechanical properties of the known materials such as Sormite and Colmonoy used in hard facing parts exposed to rapid wear, abrading for example, in a dust-laden gas at elevated temperatures.

Another important object of the present invention is to incorporate in the material some relatively cheap ingredients such as chromium and titanium which are available in abundance.

A further object of the present invention is to provide a material which lends itself to deposition in various forms (pelletized, crushed, formed into spray wire from powder, cast as electrodes), using various techniques.

These and other objects are attained by providing a wear-resistant composite material comprising a refractory chemical compound in particulate form and an alloy matrix in which the particles incorporate, in accordance with the invention, chromium between 7 and 30 wt.%, titanium between 40 and 60 wt.% and boron between 30 and 40 wt.%, have a size of 0.3 to 2 mm and are present in an amount between 40 and 80 vol.%, the balance being the alloy matrix.

DETAILED DESCRIPTION OF PREFERRED EMBODIMENTS

In the material disclosed, the particles of the chemical composition are prepared from cheap raw materials replacing the expensive tungsten which is in short supply. The composite material contains particles of refractory components in an amount a up to 80% which have good mechanical properties and are firmly held in the alloy matrix with the result that the material disclosed displays a wear resistance which is superior to that of other composite materials in wide-spread use for hard-facing applications at present.

Used as the alloy matrix in the wear-resistant composite material disclosed can be any known low-melting alloy. It is preferred that the alloy matrix contains copper between 30 and 65 wt.%, nickel between 10 and 35 wt.% and manganese between 10 and 35 wt.%. This chemical composition of the alloy assures good wettability of both the surface to be hard-faced and the solid particles which are ingredients of the material, dissolves these particles slightly and imparts plasticity to the wear-resistant composite material so that its tendency to form cracks is suppressed.

The alloy matrix may be composed of chromium present in an amount between 12 and 25 wt.%, silicon (1.5–4 wt.%), boron between 1 and 4 weight percent, the balance being nickel. If of the above composition, the alloy matrix is even cheaper and imparts better wear-resistant properties to the composite material. Yet the tendency to form cracks limits the application of this alloy matrix to hard-facing only small parts.

The invention will be best understood from the following examples illustrating possible chemical compositions of the wear-resistant material.

EXAMPLE 1

Blast furnace valves were hard-faced with a material composed in accordance with the invention of 40 parts by volume of a chemical compound in particulate form with a size of 0.3 to 1 mm which included 7 wt.% of chromium, 53 wt.% of titanium and 40 wt.% of boron, the balance being a matrix of the following composition: copper, 30 wt.%; nickel, 35 wt.% and manganese, 35 wt.%.

The service life of a valve hard-faced with the material was 8 to 10 months under the conditions of abrasive wear in gas compared with 3 or 4 months maximum for a Sormite-faced valve subjected to the rigors of continuous service under the same conditions.

EXAMPLE 2

Blast furnace valves were hard-faced with a material composed of 80 vol.% of a chemical compound in particulate form with a size of 1 to 2 mm which included 30 wt.% of chromium, 40 wt.% of titanium and 30 wt.% of boron, the balance being a matrix of the following composition: 65 wt.% of copper, 25 wt.% of nickel and 10 wt.% of manganese.

The service life of a valve hard-faced with the material was 8 to 10 months under the conditions of abrasive wear in gas compared with 3 or 4 months maximum for a Sormite-faced valve subjected to the rigors of continuous service under the same conditions.

EXAMPLE 3

Blast furnace valves were hard-faced with a material composed of 50 vol.% of a chemical compound in particulate form with a size of 0.3 to 1 mm which included 10 wt.% of chromium, 60 wt.% of titanium and 30 wt.% of boron, the balance being a matrix of the following composition: 60 wt.% of copper, 20 wt.% of nickel and 20 wt.% of manganese.

The service life of a valve hard-faced with the material was 18 to 20 month compared with 3 or 4 mounts maximum for a Sormite-faced valve subjected to the rigors of continuous service under the same conditions.

EXAMPLE 4

Blast furnace valves were hard-faced with a material composed of 50 vol.% of a chemical compound in particulate form with a size of 0.3 to 0.7 mm which included 20 wt.% of chromium, 40 wt.% of titanium and 40 wt.% of boron, the balance being a matrix of the following composition: 65 wt.% of copper, 25 wt.% of nickel and 10 wt.% of manganese.

The service life of a valve hard-faced with the material was 9 to 10 months compared with 3 or 4 months maximum for a Sormite-faced surface subjected to the rigors of continuous service under the same conditions.

EXAMPLE 5

A surface was hard-faced with a material composed of 50 vol.% of a chamical to compound in particulate form with a size between 0.3 and 0.7 mm which included 20 wt.% of chromium, 40 wt.% of titanium and 40 wt.% of boron, the matrix being composed of 12 wt.% of chromium, 1.5 wt.% of silicon, 1 wt.% of boron and 85.5 wt.% of nickel. The resistance to wear was between 9 and 12 months under the conditions of abrasive wear in gas compared with 4 months maximum for a Sormite-faced surface subjected to the rigors of continuous service under the same conditions.

EXAMPLE 6

Blast furnace valves were hard-faced with a material composed of 50 vol.% of a chemical compound in particulate form with a size between 0.3 and 0.7 mm which included 10 wt.% of chromium, 50 wt.% of titanium and 40 wt.% of boron. The material was also composed of a matrix of the following composition: 25 wt.% of chromium, 4 wt.% of silicon, 4 wt.% of boron and 67 wt.% of nickel. The resistance to wear under the conditions of abrasive wear in gas was between 12 and 14 months compared with 4 months maximum for a Sormite-faced surface, subjected to the rigors of continuous service under the same conditions.

As it can be seen from the Examples, tests have proved that the composite material disclosed has a high resistance to wear. It contains no expensive components or those which are in short supply and can therefore enjoy wide-spread application. In addition, the material can be deposited in various forms, e.g., pelletized, crushed, formed into spray wire from powder, cast as electrodes.

What is claimed is:

1. A wear-resistant composite material consisting of 40–80 volume % of a refractory chemical compound in particulate form with a size of 0.3–2 mm and consisting essentially of, by weight, 7–30% chromium, 40–60% titanium and 30–40% boron; and 20–60 volume % of an alloy matrix consisting essentially of, by weight, 12–25% chromium, 1.5–4% silicon, 1–4% boron and the balance being nickel.

2. The wear-resistant composite material as claimed in claim 1 consisting of 50 volume % of a refractory chemical compound in particulate form with a size of 0.3–0.7 mm and consisting of, by weight, 20% chromium, 40% titanium and 40% boron; and 50 volume % of an alloy matrix consisting essentially of, by weight, 12% chromium, 1.5% silicon, 1% boron and the balance being nickel.

3. The wear-resistant composite material as claimed in claim 1 consisting of 50 volume % of a refractory chemical compound in particulate form with a size of 0.3–0.7 mm and consisting of, by weight, 10% chromium, 50% titanium and 40% boron; and 50 volume % of an alloy matrix consisting essentially of, by weight, 25% chromium, 4% silicon, 4% boron and the balance being nickel.

* * * * *